United States Patent [19]
Lebbolo et al.

[11] Patent Number: 5,642,251
[45] Date of Patent: Jun. 24, 1997

[54] PROTECTION CIRCUIT FOR DC SUPPLY

[75] Inventors: Guillaume Lebbolo, Rueil Malmaison; Claude Prevot, Antony; Michel Rincent, Issy les Moulineaux, all of France

[73] Assignee: Thomson-CSF, Paris, France

[21] Appl. No.: 550,205

[22] Filed: Oct. 30, 1995

[30] Foreign Application Priority Data

Nov. 4, 1994 [FR] France .................................. 94 13194

[51] Int. Cl.$^6$ .................................................. H02H 3/00
[52] U.S. Cl. .................. 361/84; 361/93; 361/115
[58] Field of Search ........................ 361/82, 84, 93, 361/88, 115

[56] References Cited

U.S. PATENT DOCUMENTS

| | | | |
|---|---|---|---|
| 4,686,473 | 8/1987 | Chesneau et al. | 324/320 |
| 4,725,803 | 2/1988 | Prevot et al. | 335/299 |
| 4,736,161 | 4/1988 | Prevot et al. | 324/318 |
| 4,740,772 | 4/1988 | Prevot | 335/299 |
| 4,755,754 | 7/1988 | Sireul et al. | 324/318 |
| 4,835,649 | 5/1989 | Salerno | 361/18 |
| 4,857,985 | 8/1989 | Miller | 361/82 |

FOREIGN PATENT DOCUMENTS 9311361  10/1993  Germany .................. H02H 3/18

OTHER PUBLICATIONS

R. A. Maddox, Overcurrent Protector with Automatic Reset; IBM Technical Disclosure Bulletin, vol. 18, No. 8, Jan. 1976, p. 2430.

*Primary Examiner*—Jeffrey A. Gaffin
*Assistant Examiner*—Stephen Jackson
*Attorney, Agent, or Firm*—Oblon, Spivak, McClelland, Maier & Neustadt, P.C.

[57] ABSTRACT

The disclosure relates to the protection circuits interposed between a DC supply and a load circuit to protect the load circuit against short-circuits or reversals in polarity of the supply. The protection is obtained by means of a MOS power transistor connected between the supply and the load circuit. This transistor is turned on if it receives a voltage Vg from a bias circuit through a control circuit. The bias circuit delivers the voltage Vg only if the voltage given to it by the supply is sufficient while the control circuit turns the power transistor off if the output of the supply gets short-circuited or gives a voltage with reversed polarity.

3 Claims, 2 Drawing Sheets 5,642,251

PROTECTION CIRCUIT FOR DC SUPPLY

TECHNICAL FIELD

The invention relates to the field of DC supplies and their protection and more specifically to a circuit positioned at the output of a supply and designed firstly to protect the load circuit against reversals of polarity and, secondly, to maintain the energy reserves of the load circuit during brief power cuts or short-circuits.

BACKGROUND OF THE INVENTION

There are known ways of making a protection circuit such as this by placing a diode in a series connection in the line between the supply and its load circuit. The drawback of the protection thus made is that, as the diode introduces a voltage drop of about one volt, there results a non-negligible level of power dissipation.

SUMMARY OF THE INVENTION

The present invention is aimed at proposing a protection circuit that entails a level of power dissipation appreciably lower than the dissipation caused, under the same conditions, by a protection diode.

This is obtained by means of a MOSFET type power transistor appropriately controlled by its gate and having its source and drain introduced in a series connection into the line between the supply and the load circuit of this supply.

According to the invention, there is provided a protection circuit for a supply delivering a DC voltage V, between a first terminal and a second terminal, this circuit comprising a MOSFET power transistor having a source and a drain placed in a series connection with the first terminal and having a gate, a bias circuit having an output and being connected between the two terminals in order to set up a voltage Vg with a given value at its output when and only when the voltage V is greater than a predetermined value, this given value being such that the voltage Vg turns the power transistor on when it is applied to its gate, and a control circuit to couple the output of the bias circuit to the gate of the power transistor and to monitor the difference in voltage between the drain and the source of the power transistor so that, when the difference exceeds a given threshold, it prevents the application of the voltage Vg to the gate of the power transistor and thus turns the power transistor off.

BRIEF DESCRIPTION OF THE DRAWINGS

The present invention will be understood more clearly and other characteristics shall appear from the following description and the figures pertaining thereto, of which.

In the different drawings, the corresponding elements are designated by the same references.

MORE DETAILED DESCRIPTION

Figure 1:
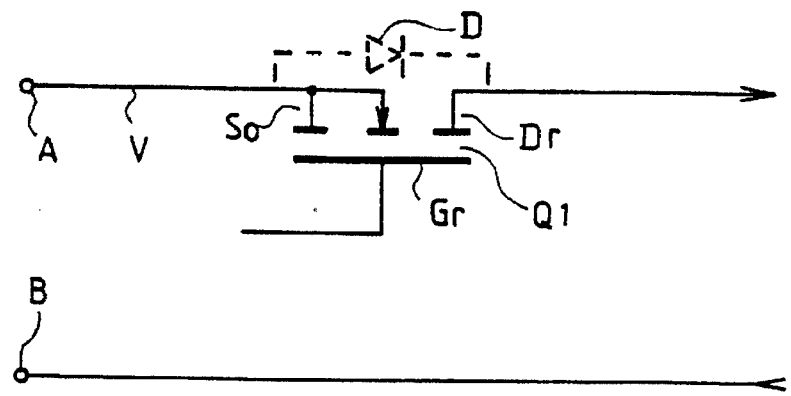
FIGS. 1 and 2 show possibilities of assemblies of power transistors in circuits according to the invention.

FIG. 1 shows the two output terminals A, B of a DC supply that delivers a voltage V. In series with the terminal A, in the current output conductor, there are inserted the source So and the drain Dr of an N channel MOSFET transistor Q1. To turn this transistor on, a control voltage greater than V must be applied to its gate Gr. The diode D constituted by the transistor Q1 has been represented by dashes when it is in the off state. It must be noted than this diode, when the transistor Q1 is off, maintains the power reserves, if any, located downline in the load circuit (not shown) connected between the drain of the transistor and the terminal B.

Figure 2:
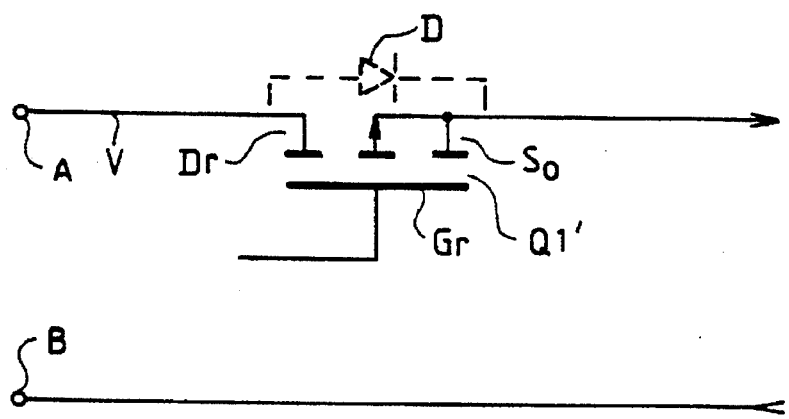

FIG. 2 shows an assembly corresponding to that of FIG. 1, but with a P channel MOSFET transistor Q1'. In this assembly, the position of the drain Dr and the source So are reversed with respect to the assembly according to FIG. 1, but the diode D formed by the transistor Q1' which is off also maintains the energy reserves, if any, of the load circuit.

In order to be turned on, all that the transistor Q1' needs at its gate is a voltage lower than the voltage V. The use of a P channel transistor would therefore appear to be more worthwhile, but this is not at all the case, especially as an N channel MOSFET transistor has an internal resistance in linear operation that is appreciably lower than that of a P channel MOSFET transistor. Now, it is precisely as low an internal resistance as possible that is sought for the protection circuit in order to minimize the energy losses due to this circuit. Hereinafter in the description, the MOSFET transistor inserted for protection between the supply and the load circuit will be an N channel MOSFET transistor.

Figure 3:
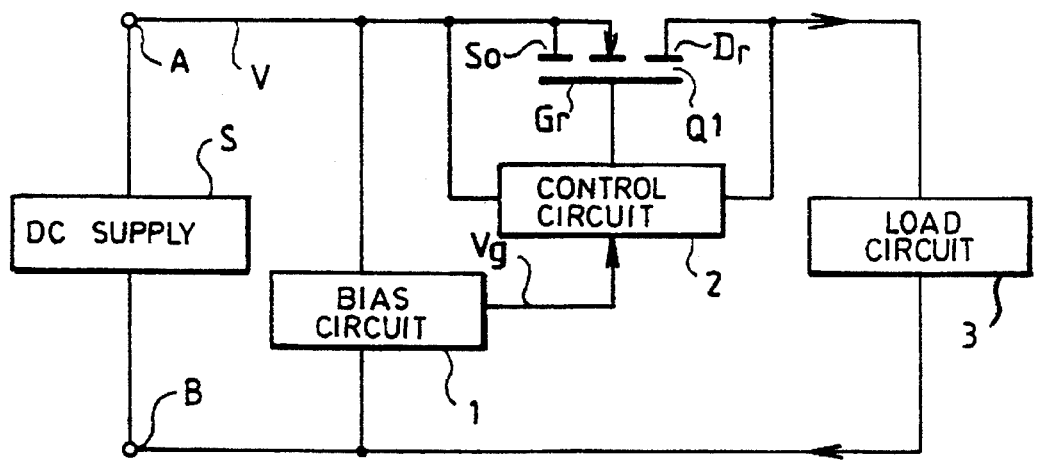
FIG. 3 is a simplified electrical diagram of a circuit according to the invention.

FIG. 3 is a simplified electrical diagram showing a DC supply S with its output terminals A, B, a block 3 schematically representing a load circuit and, between the terminals A, B and the block 3, a protection circuit comprising a bias circuit 1, a control circuit 2 and an N channel MOSFET power transistor Q1.

As in FIG. 1, the transistor Q1 is series connected in the "current output" conductor coming from the terminal A and leading to the load circuit 3 while the return conductor goes from the load circuit to the terminal B.

The bias circuit 1 is connected between the terminals A and B. It receives a DC voltage V delivered by the supply. Its role is to provide a voltage Vg with a given value if and only if the voltage V is greater than a predetermined value. The value of Vg is chosen so that when this voltage is applied to the gate of the transistor Q1, it makes this transistor conductive.

The voltage Vg is applied to the gate of the transistor Q1 through the control circuit 2. The control circuit 2 monitors the difference between the voltage at the terminals of the load circuit 3 and the voltage V. When this difference crosses a given threshold, the control circuit prevents the application of the voltage Vg to the gate of the transistor Q1 in order to turn the transistor off.

The voltage Vg, as was indicated in the description of FIG. 1, is greater than V during the normal operation of the supply. In the exemplary embodiment described here, V=28 volts and Vg=40 volts.

The bias circuit 1 may be considered to be formed by two cascade-connected circuits:

- a threshold circuit which, so long as the voltage V is greater than a given value equal herein to 16 volts, gives a DC voltage Va,
- a voltage conversion circuit which uses the voltage Va to prepare the voltage Vg. This voltage conversion circuit is constituted, in the example described, by an oscillator followed by a "diode-based pump" also called a Schenkel pump or a Greinacher type generator.

The role of the control circuit is to turn the transistor Q1 off in the event of a short-circuit or a reversal of polarity of the DC voltage. For this purpose, it monitors the voltage between the drain of the transistor Q1 and the terminal B and, when this voltage is greater than the voltage V, turns the transistor Q1 off by short-circuiting the gate control.

Figure 4:
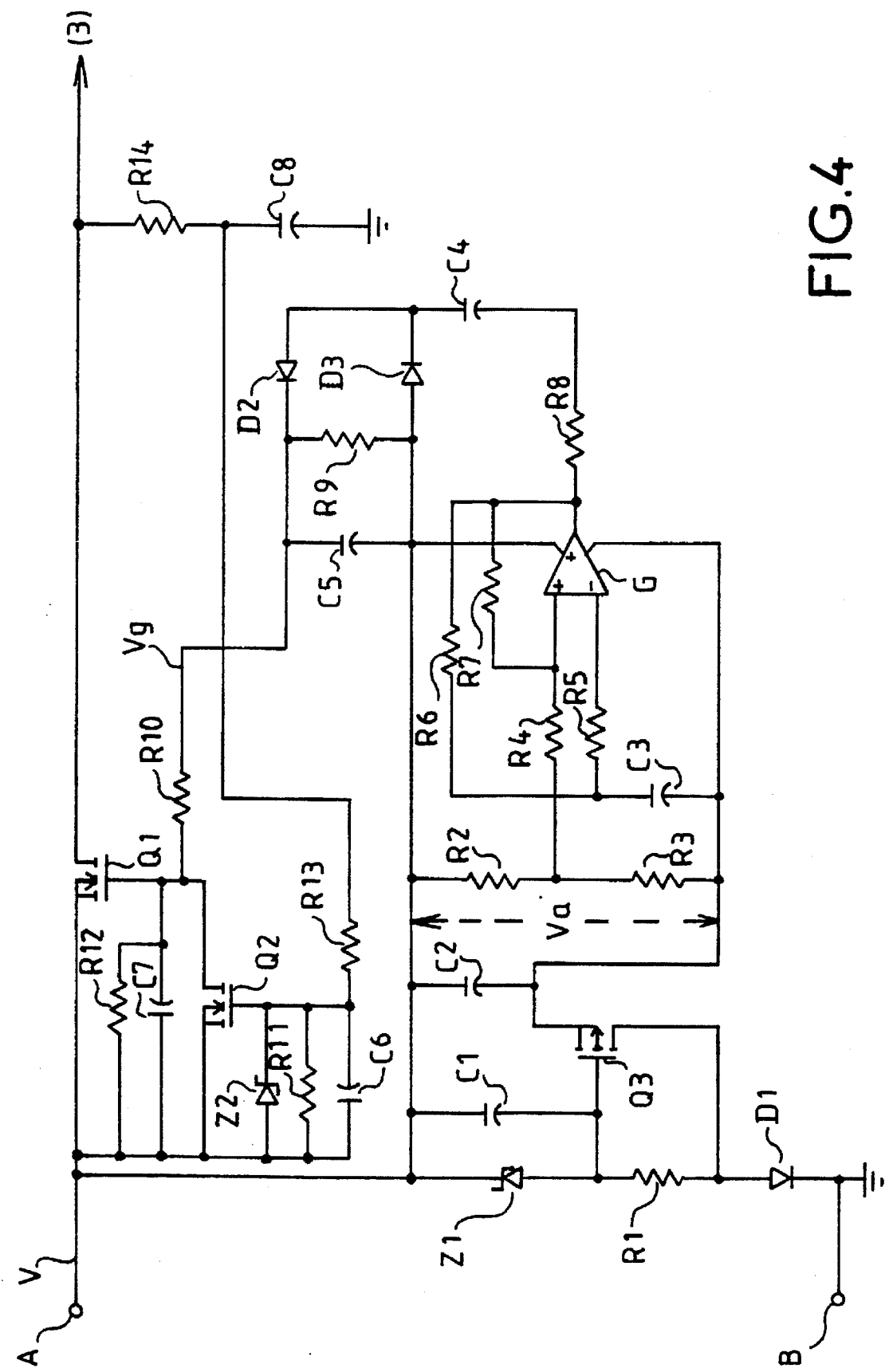
FIG. 4 shows a general electrical diagram of a circuit according to the invention.

FIG. 4 is a more detailed diagram of a protection circuit according to FIG. 3 in which there can be seen, notably, the transistor Q1 and the terminals AB already shown in FIG. 3.

According to FIG. 4, the bias circuit 1 of FIG. 3 has resistors R1–R9, capacitors C1–C4, diodes Z1, D1–D3, a transistor Q1 and a circuit G that is a comparator. This comparator, owing to the assembly, is astable and works as a multivibrator.

The threshold circuit referred to in the description of the bias circuit 1 of FIG. 3 has the elements Z1, R1, D1, Q3, C1 and C2. The diode Z1 is a Zener diode which has its cathode connected to the terminal A to which, in normal operation, there is applied the voltage V of 28 volts. The diode Z1 is coupled, through the resistor R1, to the anode of the diode D1 whose cathode is connected to the terminal B which is itself connected to the ground. The capacitor C1 is parallel-mounted on the diode Z1. The transistor Q3 is a P channel MOSFET transistor whose gate, source and drain are respectively connected to the anode of the diode Z1, to the first terminal of the capacitor C2 whose second terminal is connected to the terminal A, and to the anode of the diode D1.

The diode Z1 has a Zener voltage of 15 volts. It is this diode that defines the lower boundary of the supply voltage V from which the power transistor Q1 may be controlled in order to be turned on. For a voltage V of 28 volts, the voltage at the gate of Q3 is equal to 28 V–15 V=13 V. Since the source-gate voltage is about 3 V, the voltage at the source of the transistor Q3 is equal to 13 V+3 V=16 V with respect to the ground. This represents a differential DC voltage Va of 12 volts at the terminals of the capacitor C2.

The voltage Va keeps this value of 12 volts irrespective of the value of the supply voltage V, provided however that the voltage V is greater than 15 V+1 V=16 V. The 1 V in this equation corresponds to the voltage drop in the diode D1. This diode D1 enables the protection circuit to be turned off in the event of a reversal of polarity.

It is the voltage Va that is applied to the input of the oscillator referred to in the description of the bias circuit 1 of FIG. 3.

The oscillator has the elements R2–R8, C3 and G while the diode pump, also referred to in the description of FIG. 3, has the elements C4, C5, R9, R10, D2, D3. The resistors R2, R3 form a series-connected assembly that is parallel-connected on the capacitor C2. The resistor R4 connects the common point of the resistors R2, R3 to a plus input of the circuit G, a minus input of which is connected by the resistor R5 followed by the capacitor C3 to the source of the transistor Q3. The circuit G has one output and this output is connected through the resistors R6, R7, R8 respectively to the common point between the resistor R5 and the capacitor C3, to its plus input and to the first terminal of the capacitor C4. The two bias ports of the circuit G are connected respectively to the two terminals of the capacitor C5.

Thus mounted, the oscillator is biased by the 12 volt differential voltage Va, with the voltage V–Va=28–12=16 volts which is used by it as a reference potential. This is a relaxation type of oscillator that gives a square-wave signal of 12 volts at 22.7 kHz.

The diode pump has the elements C4, C5, D2, D3, R9. It is understood that the resistor R8 of the oscillator and the capacitor C4 of the diode pump both together actually constitute the link between these two circuits.

The capacitor C4 which is connected by its first terminal to the resistor R8 is connected by its second terminal to the anode of the diode D2 and to the cathode of the diode D3. The cathode of the diode D2 is connected through a resistor R10, which forms part of the control circuit 2 according to FIG. 3, to the gate of the transistor Q1 and the anode of the diode D3 which is connected to the terminal A. The resistor R9 and the capacitor C5 are parallel-connected between the cathode of the diode D2 and the anode of the diode D3.

The oscillator enables the voltage at the terminals of the capacitor C5 to be sustained so long as the energy given is lower than the energy consumed.

The diode pump enables 12 volts to be provided at the terminals of the capacitor C5. These 12 volts are added to the supply voltage V=28 volts since the capacitor C5 is connected to the terminal A. Thus, the voltage delivered by the diode pump to bias the gate of the power transistor Q1 is 28 V+12 V=40 V for a nominal supply voltage V of 28 volts while the source of the transistor Q1 receives a voltage of 28 volts. The transistor Q1 is therefore perfectly biased to be conductive. In the example described, it is a 75N10 type MOS transistor with an internal source-drain resistance in linear operating mode of about 20 m.ohms. For example, the voltage drop caused by the protection circuit for a current of 10A in the load circuit 3 according to FIG. 3 is 0.2 V because of the transistor Q1 and 0.1 V because of the connections, giving a total of 0.3 V.

According to FIG. 4, the control circuit 2 of FIG. 3 has resistors R10–R14, capacitors C6–C8, a diode Z2 and a transistor Q2. The transistor Q2 is an N channel MOSFET transistor whose source and drain are respectively connected to the source and gate of the power transistor Q1 and whose gate is coupled by the resistor R13 to the first ends of the resistor R14 and of the capacitor C8. The second ends of the resistor R14 and of the capacitor C8 are respectively connected to the drain of the transistor Q1 and to the ground, namely to the supply terminal B. The diode Z2 is a Zener diode with a Zener voltage of 7.5 V, having its anode and cathode connected respectively to the source and to the gate of the transistor Q2. The resistor R11 and the capacitor C6 are parallel-connected and connected to the terminals of the diode Z2. The resistor R12 and the capacitor C7 are parallel-connected and connected between the source and the drain of the transistor Q2.

So long as the supply voltage V is greater than the voltage brought by the resistor R13 hence, in particular, so long as the DC voltage is not short-circuited or the polarity of its output voltage is not reversed, the voltage at the gate of the transistor Q2 is lower than the voltage at its source and the transistor Q2 is therefore off. The voltage Vg that comes from the bias circuit 2, described by means of FIGS. 3 and 4, is applied to the gate of the transistor Q1 making this transistor conductive.

By contrast, in the event of a short circuit of the DC supply or a reversal of its output voltage, the transistor Q2 becomes conductive, creating a short circuit between the gate and the source of the transistor Q1. The transistor Q1 is then off. However, the saturation threshold of the transistor Q2 as well as the integration time constant due to the elements R14, C18 make it possible to prevent the untimely deactivation of the transistor Q1.

The invention is not limited to the example described with reference to the figures. Indeed, as shown in FIG. 3, two circuits have to be made:

a bias circuit to deliver a voltage Vg so long as the voltage V is greater than a given value, a control circuit to prevent the voltage Vg from being applied to the gate of the transistor Q1 when the voltage difference between the drain and the source of the power transistor is greater than a predetermined value, and it must be noted that the current art offers those skilled in the art various possibilities for making such circuits.

It must also be noted that the invention can be applied to cases where the supply gives a positive voltage as well as to cases where its gives a negative voltage and that, for example, for a voltage V of −28 volts, the diagram of FIG. 4 may be used, provided that the terminal A is grounded and the terminal B is at −28 volts.

What is claimed is:

1. A protection circuit adapted to protect a direct current voltage supply which supplies a voltage, V, between a first terminal and a second terminal, comprising:

a MOSFET power transistor comprising, a gate, a source, and a drain, said source and drain connected in series with said first terminal;

a bias circuit disposed between said first terminal and said second terminal and configured to provide a predetermined gate voltage, Vg, to a bias circuit output only when the voltage, V, is greater than a predetermined value, said predetermined gate voltage, Vg, being set to turn on said MOSFET power transistor when applied to said gate; and a control circuit connected to said bias circuit output, and configured to monitor a voltage difference between said drain and said source and to prevent said predetermined gate voltage, Vg, from being applied to said gate so as to turn said MOSFET power transistor off when said voltage difference exceeds a threshold voltage indicative of a reverse polarity condition.

2. A protection circuit according to claim 1, wherein the bias circuit comprises, in series, a voltage threshold circuit connected between the first terminal and the second terminal and a voltage conversion circuit.

3. The protection circuit of claim 1, wherein said control circuit comprises:

monitoring means for monitoring a voltage potential difference between the drain and the source of the MOSFET power transistor; and deactivation means for connecting the gate to the source to turn off the MOSFET power transistor when the monitoring means determines the voltage potential difference exceeds said predetermined threshold.

* * * * *